Figure 1:
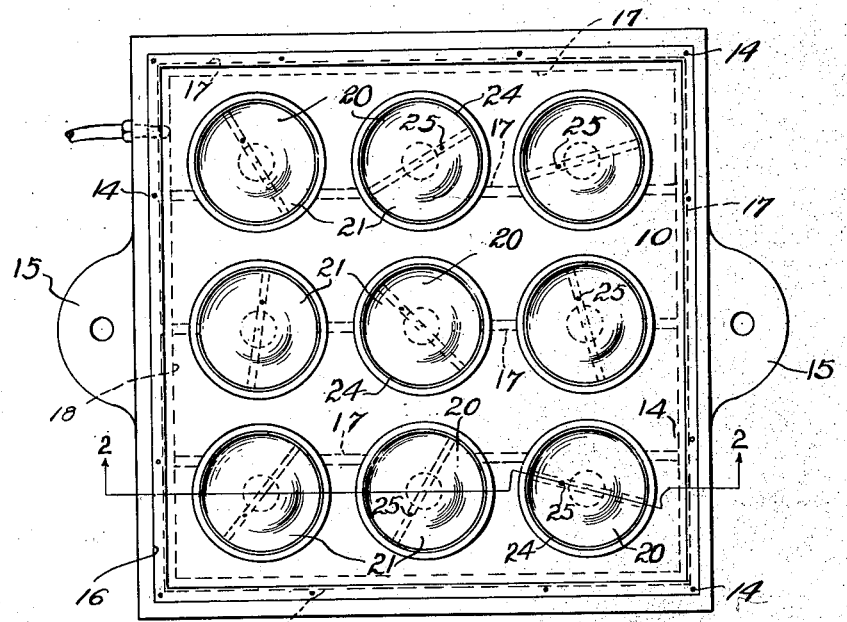

Sept. 15, 1925.   1,553,560

J. SCHAEFER

MOLD FOR RUBBER ARTICLES

Filed April 28, 1924   2 Sheets-Sheet 1

INVENTOR
James Schaefer
By Baker, Macklin, Goebel & Tear
ATTORNEYS

Sept. 15, 1925.  1,553,560

J. SCHAEFER

MOLD FOR RUBBER ARTICLES

Filed April 28, 1924  2 Sheets-Sheet 2

INVENTOR
James Schaefer
By Bates, Macklin, Goldrick & Fears
ATTORNEYS

Patented Sept. 15, 1925.

1,553,560

UNITED STATES PATENT OFFICE.

JAMES SCHAEFER, OF YONKERS, NEW YORK, ASSIGNOR TO PARAMOUNT RUBBER CONSOLIDATED, INCORPORATED, OF TUCKAHOE, NEW YORK, A CORPORATION OF DELAWARE.

MOLD FOR RUBBER ARTICLES.

Application filed April 28, 1924. Serial No. 709,484.

*To all whom it may concern:*

Be it known that I, JAMES SCHAEFER, a citizen of the United States, residing at Yonkers, in the county of Westchester and State of New York, have invented a certain new and useful Improvement in a Mold for Rubber Articles, of which the following is a full, clear, and exact description, reference being had to the accompanying drawings.

This invention relates to a mold for the manufacture of hollow rubber articles, wherein sheet stock is pneumatically seated in mold cavities. More particularly the invention relates to a multiple mold having individual cavitary blocks of the general type shown in application No. 483,404, filed July 9th, 1921, by Fred Thomas Roberts, (Patent No. 1,503,666) on which the present invention is an improvement.

The objects of the present invention are:

To enable any cavity block to be removed and readily replaced when desired; to so arrange the mold that the pneumatic passageways will not become clogged by the soapstone or other materials used with the rubber sheets; to reduce the size of the suction chamber in the base of the mold and render it more efficient, and to simplify and cheapen the construction.

In carrying out the above objects, I provide a mold frame having a series of cylindrical openings in it, in which are mounted blocks externally cylindrical, having cavities according to the article to be manufactured. Across the base of each block is formed a groove terminating at its end in an annular rabbet in the edge of the block. A passageway leads from the cavity through the block to the transverse groove. Suitable exhaustion grooves are made in the holder frame or base and communicate with the passageway provided by the annular rabbet, irrespective of the position of the block in the holder.

Now when a suction conduit is attached to the frame of the mold in communicating with the suction chamber provided by the internal grooves, continuous passageways are provided within the mold from the cavities to such exhaust pipe, irrespective of the particular position of the mold blocks in the holder. This enables any block to be removed, with the assurance that when returned there will be a continuous suction passageway from its cavity. This is one of the features of the invention.

It is important that all of the blocks meet their opposing blocks accurately and with the same precision when the mold members are brought together, so that not only may a seam be formed, but the two sheets of rubber be cut through to cut out the biscuit. Instead of attempting to adjust the different blocks in the holder, so that they will come exactly to the same plane at their edges, I mount the blocks in the upper mold member tight in the holder and the blocks in the lower mold member sufficiently loose so that they may be readily removed, and then after a trial, I remove any lower mold block that may not quite reach the upper block and place a shim of paper beneath it.

As the composite mold wears, the individual blocks may not wear exactly alike, and whenever I find that any particular biscuit is not being properly cut out, it is only necessary to raise that particular block without disturbing the rest of the mold. This ability to remove a block and reinsert it whenever desired is rendered practicable by means of the feature heretofore described, of having an annular groove or rabbet at the base of each block so that it will make proper connection with the suction passageway irrespective of the angular position of the block in the holder. This characteristic of the tight upper blocks and the loose lower blocks of the character described is another feature of the invention.

In making the holders so that the upper blocks will be tight and the lower blocks loose, I find that this can be readily done by clamping the two holder plates together and placing them with the bottom plate on top and drilling through them as a unit from the top. In this action the spring or wobble of the drill causes the upper hole to be slightly larger than the lower and this is just enough so that the one plate holds loosely, while the other plate holds tightly, a mold block of the same size. By this very simple expedient I obtain a tight holder for the upper mold member and a loose holder for the lower member, I find that when the rubber is seated pneumatically, and particularly when it is drawn to its seat by suction, there is a tendency of the soapstone, which is rubbed from the face of the rubber sheet, to pass into the suction cavities and clog them. This clogging is reduced by enlarging the passageway from the mold cavity into the transverse groove in the block, shortly after the passageway leaves the cavity. To prevent any clogging of the transverse passageway I provide a central enlargement thereof, which provides a chamber in which the soapstone may lodge. I find this effective in preventing the passageway becoming clogged. This is also a feature of the invention.

Other features of invention will be apparent from the description of the embodiment illustrated in the drawings.

Figure 2:
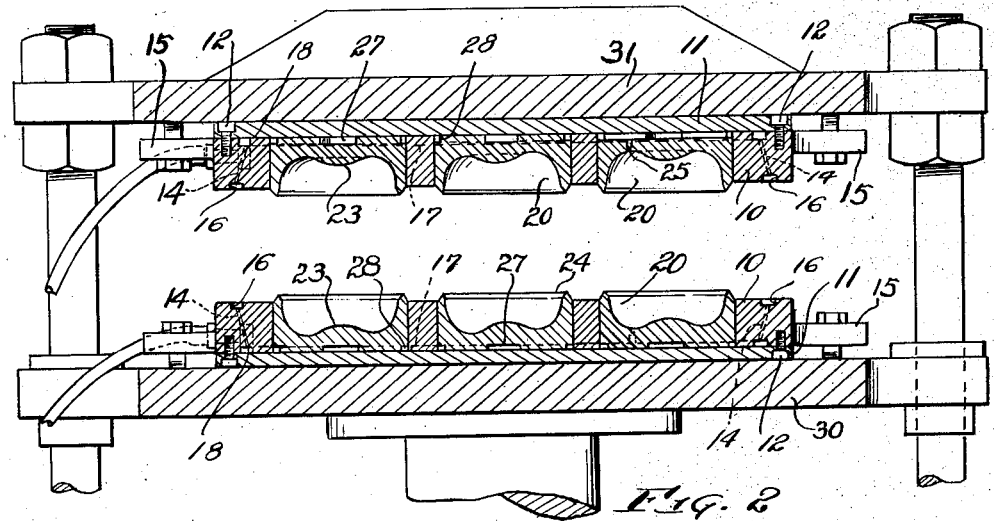
Figure 3:
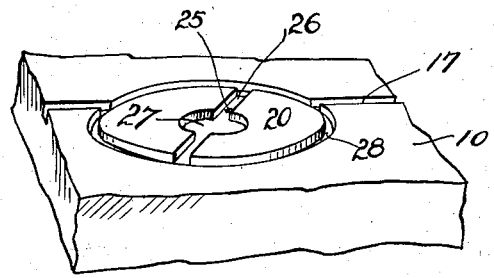
Figure 4:
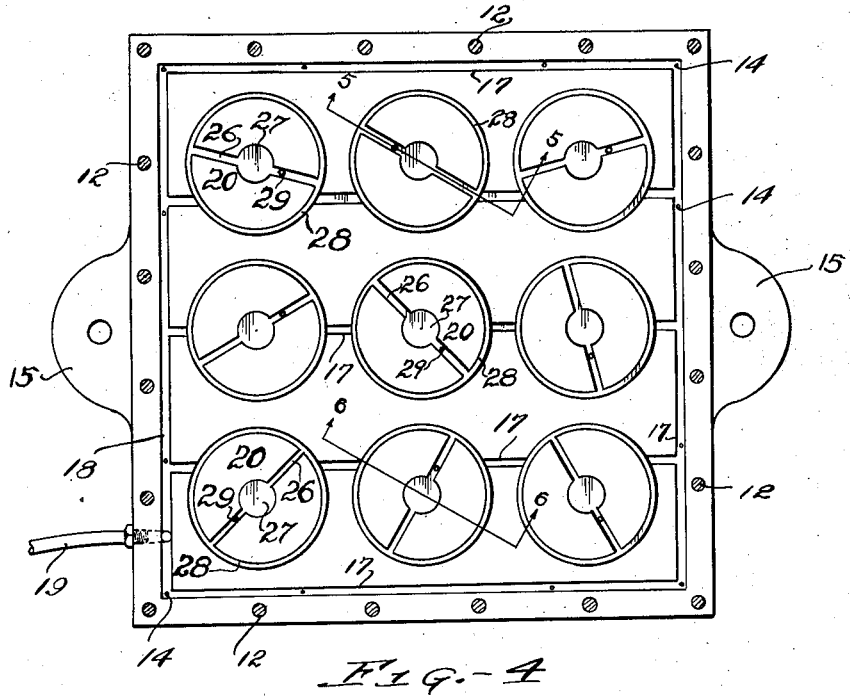
Figure 5:
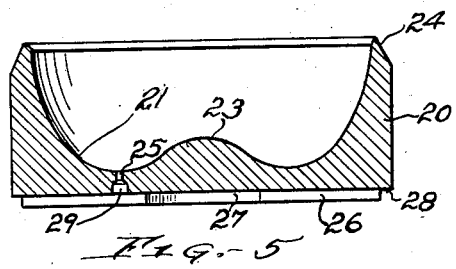
Figure 6:
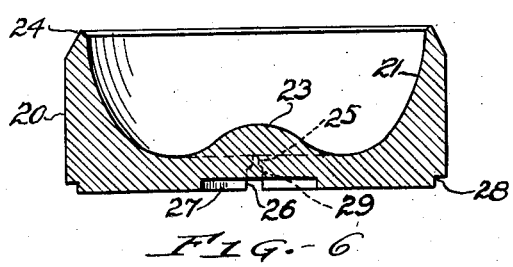

Fig. 1 is a plan of one of the mold members with inserted blocks corresponding to my invention; Fig. 2 is a vertical section through the upper portion of a platen press equipped with cooperating upper and lower mold members; Fig. 3 is a bottom perspective of one of the mold blocks and the adjacent portion of the holder; Fig. 4 is a bottom view of one of the mold holders with the blocks inserted therein and the base plate removed; Figs. 5 and 6 are cross sections through one of the mold blocks on the planes indicated by the lines 5—5 and 6—6 in Fig. 4.

In the drawings, 10 indicates the body or holder member of the upper or lower mold, which is simply a flat plate with cylindrical holes drilled through it. Secured tightly to this plate, about the margin thereof is a base plate 11. The cavitary mold blocks 20 occupy the cylindrical openings in the frame plate and rest firmly on the base plate.

As shown in Figs. 1 and 2, each frame plate is provided with ears 15 by which it may be secured to a movable platen 30 or a stationary top platen 31 of a suitable mold press. On the underside of each plate 10 are formed various grooves 17 which intersect the cylindrical openings for the mold blocks. These grooves at one end join a header groove 18 with which communicates an exhaust pipe or hose 19, the inner end of which is affixed to the mold member. In the upper face of the mold member is a groove 16 extending about the set of cavities and connected with the exhaust passageway by openings 14.

It will be seen that the grooves in the base of the mold member after the base plate has been applied, constitute a suction chamber with which the exhaust pipe communicates. I find that the base plate may readily make an air tight connection with the frame plate, by simply placing shellac between them at the margin and passing screws 12 at short intervals into the base plate through the frame plate. By inclining the passageways 14 as shown I may locate the base border grooves a sufficient distance from the edge to allow ample margin for the screws, without increasing the size of the mold.

Inasmuch as the vacuum must be reestablished throughout the entire suction chamber for each operation, it is desirable to reduce this area as much as practicable, and this has been accomplished in the mold shown, the suction chamber comprising simply the parallel passageways to intersect the various cavity blocks and the border passageways providing for suction from the vacuum seating groove above. All of these under passageways may be very cheaply made by simply grooving the underface of the mold frame and applying the base plate on the bottom thereof.

The outer wall of each mold block 20 is cylindrical to properly cooperate with the cylindrical cavity of the upper mold members, making a tight connection with the upper mold members and a sliding connection with the lower mold member, as heretofore mentioned.

The blocks 20 have formed in them cavities 21 of some suitable shape, corresponding to the article to be produced. As shown, the cavity as formed with a hump 23 for the purpose described in Patent Reissue No. 14,604 of Fred Thomas Roberts, though other forms of cavities may be employed if desired. Surrounding the cavity is an annular cutting edge 24 chamfered inwardly and outwardly.

Across the base of each block 20 is a diametric groove 26 centrally enlarged by a chamber 27, while at the outer edge of the base is the annular rabbet 28. If the blocks are cast, it is convenient to provide the central enlargement first at the time of casting and thereafter machine the diametric groove, the central cavity reducing the length of cut for such machine. The rabbet may be readily made in a lathe. After the diametric groove has been made, I drill the larger portion of the upright opening, as shown at 29 from the groove 26 toward the cavity stopping the drill short of entering the cavity and then from the point of this drilled hole, I make the small opening 25 leading into the cavity.

The individual blocks may be readily machined and then are simply inserted in the cylindrical openings in the plates and the mold is ready for use. In use, the passageways do not clog, and any particular block which becomes defective may be readily removed and a substitution made. I find that except in the case of absolute breakage, the substitutions may be all made in the lower mold member, notwithstanding that the wear may be on the upper member, the essential characteristic in this regard being that each pair of cavities come to exactly the same approach, though the meeting edges of different pairs may not be exactly in the same plane.

I claim:

1. A mold for making rubber articles, comprising a holder, a cavitary mold block therein, an annular groove at the junction of the bottom edge of the block and the holder, an additional groove in the mold block from the cavity to said annular groove, and a passageway in the holder communicating with said annular groove.

2. A mold for making rubber articles, comprising a holder, a series of cavitary mold blocks therein, each having an annular rabbet at its lower edge and a passageway communicating from the cavity to said rabbet, and the holder having a passageway adapted to communicate with said rabbet irrespective of the angular position of the mold block in the holder.

3. A pair of mold members, each comprising a holder and a series of mold blocks therein, the mold blocks of the upper member being tight in the holder, and the mold blocks of the lower member being loose in the holder and being arranged to communicate with a passageway in the lower mold member irrespective of the angular position of the blocks therein.

4. In a mold the combination of a holder plate having a cylindrical opening through it, and a base plate extending across the opening, grooves in one of said plates coacting with the other plate to provide a pneumatic chamber, a mold block mounted in said cylindrical opening and having a passageway in communication with said grooves.

5. In a mold, the combination of a holder having cylindrical openings through it, and a base plate extending across the openings, grooves in the under side of the holder coacting with the base plate to provide a suction chamber and individual mold blocks mounted in the holder openings and each having an opening through it adapted to communicate with said grooves in various positions of the blocks.

6. The combination of a holder plate having cylindrical openings through it and having grooves on its underside leading to said openings, a base plate extending beneath the holder plate openings, individual mold blocks having cylindrical exteriors and adapted to occupy said openings and rest on the base plate, said blocks having forming-cavities in their upper surfaces, and each provided with an annular groove at its lower edge communicating with the forming cavity.

7. The combination, with a holder having a suction chamber therein, of mold blocks occupying the holder, each block having a cavity in its upper surface, an annular rabbet in its lower surface, a groove in its lower surface extending crosswise and a passageway in the block from the forming cavity to such transverse groove.

8. In a mold of the character described, the combination of a holder having openings for the reception of individual mold blocks, and individual cavitary blocks mounted in such openings, each having a forming cavity in its upper surface and suction passageway in its lower surface provided with an enlargement, and a passageway leading from the suction passageway to the forming cavity.

9. In a mold of the character described, the combination of a holder having openings and a base plate and individual mold blocks mounted in the openings and resting on the base plate, each mold block having a transverse groove intermediately enlarged and a passageway leading from the groove to the forming cavity.

10. In a mold of the character described, the combination of a holder having openings and a base plate and individual mold blocks mounted in the openings and resting on the base plate, each mold block having at its bottom a transverse groove intermediately enlarged, a passageway leading from the groove to the forming cavity and an annular rabbet formed about the bottom edge of the mold block, the transverse groove communicating with said rabbet.

11. In a mold of the character described, the combination of a holding plate having cylindrical openings through it, a base plate tightly secured to the holder plate, one of said plates having grooves coacting with the other plate to form a suction chamber, an exhaust pipe communicating with the suction chamber, and a series of cavitary mold blocks seated in the cylindrical opening and bearing against the base plate, each mold block having an annular rabbet communicating with the corresponding groove in the holder, and having a transverse groove communicating with the annular rabbet, and having a passageway leading from the forming cavity in the block to the transverse groove.

In testimony whereof, I hereunto affix my signature.

JAMES SCHAEFER.